US006858180B2

(12) United States Patent
Narayan-Sarathy et al.

(10) Patent No.: US 6,858,180 B2
(45) Date of Patent: Feb. 22, 2005

(54) PROCESS FOR INHIBITING SCALE

(75) Inventors: Sridevi Narayan-Sarathy, Hilliard, OH (US); Laurence G. Dammann, Powell, OH (US); Davor Zidovec, Jacksonville, FL (US)

(73) Assignee: Ashland Inc., Dublin, OH (US)

( * ) Notice: Subject to any disclaimer, the term of this patent is extended or adjusted under 35 U.S.C. 154(b) by 46 days.

(21) Appl. No.: 10/147,660

(22) Filed: May 16, 2002

(65) Prior Publication Data

US 2003/0215353 A1 Nov. 20, 2003

(51) Int. Cl.[7] .......................... C23F 11/00; B08B 17/00
(52) U.S. Cl. ............................. 422/7; 422/6; 524/807; 524/817; 526/258; 526/286
(58) Field of Search .................. 422/6, 7; 526/258, 526/286; 524/807, 817

(56) References Cited

U.S. PATENT DOCUMENTS

| | | | | |
|---|---|---|---|---|
| 4,081,383 A | | 3/1978 | Warburton et al. | 252/8.6 |
| 4,639,490 A | * | 1/1987 | Masler et al. | 524/765 |
| 4,833,179 A | | 5/1989 | Young et al. | 522/183 |
| 5,106,609 A | | 4/1992 | Bolich et al. | 424/70 |
| 5,108,622 A | * | 4/1992 | Liao et al. | 210/734 |
| 5,118,435 A | | 6/1992 | Nieh | 252/70 |
| 5,134,061 A | | 7/1992 | Wolff | 430/638 |
| 5,152,403 A | * | 10/1992 | Patel | 210/699 |
| 5,294,693 A | | 3/1994 | Egraz et al. | 526/310 |
| 6,444,747 B1 | * | 9/2002 | Chen et al. | 524/807 |
| 6,447,696 B1 | * | 9/2002 | Takagi et al. | 252/180 |
| 2003/0065116 A1 | * | 4/2003 | Ghosh et al. | 526/258 |

* cited by examiner

Primary Examiner—Krisanne Jastrzab
(74) Attorney, Agent, or Firm—David L. Hedden

(57) ABSTRACT

This invention relates to a process for scale inhibition using random copolymers of acrylic acid and a monomer that is hydrophobic.

10 Claims, No Drawings

PROCESS FOR INHIBITING SCALE

CROSS-REFERENCE TO RELATED APPLICATIONS

Not Applicable.

CLAIM TO PRIORITY

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION (1) Field of the Invention

This invention relates to a process for scale inhibition using random copolymers of acrylic acid and a co-monomer that is hydrophobic.

(2) Description of the Related Art

It is known to use low molecular weight ionic polymers and copolymers as scale inhibitors for cooling water towers and boilers in industry. Most commercially available polymers in the market today used for this application are based on carboxylic acid.

Copolymers of acrylic acid and monomers that have hydrophobic properties are well known, e.g. CARBOPOL® thickeners manufactured by B.F.Goodrich Co. Uses for these copolymers have been disclosed for a variety of applications. U.S. Pat. No. 5,118,435 discloses their use in anti-icing compositions, while U.S. Pat. No. 5,106,609 discloses their use as a vehicle in cosmetic compositions.

U.S. Pat. No. 4,833,179 describes the suspension polymerization of a pressure-sensitive acrylate copolymer bead containing a modifier moiety like 2-polystyrylethyl methacrylate macromonomer, which renders the copolymer bead non-agglomerating at room temperature and safely transportable. U.S. Pat. No. 5,294,693 discloses the use of an acrylic acid copolymer terminated by a fatty hydrophobic chain having at least 26 carbon atoms as a modifier of rheological properties, stabilizing agent, and suspension agent for coarse mineral or organic materials in various applications. Other known applications for these copolymers are as anti-soiling treatment for carpets and carpet yarn (U.S. Pat. No. 4,081,383) and photographic recording material (U.S. Pat. No. 5,134,061).

All citations referred to under this description of the "Related Art" and in the "Detailed Description of the Invention" are expressly incorporated by reference.

BRIEF SUMMARY OF THE INVENTION

This invention relates to a process for scale inhibition, which comprises adding a random copolymer of acrylic acid and a co-monomer that has hydrophobic properties, to an aqueous system. The random copolymers are synthesized by the reaction of acrylic acid and a co-monomer that has hydrophobic properties, typically in the presence of a mercapto chain transfer agent, a solvent (typically toluene), and an appropriate free radical initiator. However, if the mercapto transfer agent contains a hydrophobic group, it can be used as the co-monomer and no other monomer is needed to synthesize the random copolymer. The random copolymers typically have an average molecular weight of 500 to 5000, as determined by $^{13}C$ NMR. The process can be used to prevent scale from building up in cooling water towers, boilers, or other industrial applications.

The random copolymers were evaluated for scale inhibition and the data indicated that they were excellent scale inhibitors at very low dosage levels. The random copolymers were primarily tested for inhibition of calcium carbonate crystal growth, but it is believed that the random copolymers will be effective in inhibiting the formation of sulfate, phosphate, and oxalate scale.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention and will enable one skilled in the art to practice the invention, including the best mode. It is contemplated that many equivalent embodiments of the invention will be operable besides those specifically disclosed.

Co-monomers which are the source of a hydrophobic group, preferably water-soluble monomers, polymerize with acrylic acid, and include common acrylates, e.g. n-butyl acrylate and 2-ethylhexyl acrylate; surfactant molecules such as 2-(N-ethyl perfluoro octane sulfonamide) ethyl acrylate (FX-13); fatty acid modified maleamic acids, and reaction products of maleic anhydride with long chain alkyl amines as well as monofunctional mercapto compounds having hydrophobic groups. Examples of mercapto groups that contain hydrophobic groups include linear mercaptans having a chain length greater than four, such as lauryl mercaptan, butyl mercaptan and hexyl mercaptan.

If a co-monomer other than a mercapto compound having hydrophobic groups is used as the co-monomer, then the reaction must be carried out in the presence of a chain transfer agent. The function of the chain transfer agent is to control polymerization, so that the molecular weight of the copolymer does not get too high. Examples include 3-mercaptopropionic acid and 2-mercaptoethanol.

The average molecular weight of the copolymer, based upon GPC measurements, is typically from 500 to 5000, preferably from 1000 to 3000, most preferably from 1500 to 2000.

The reaction takes place in the presence of a free radical initiator. Representative examples of free radical initiators that can be used include ammonium persulfate, potassium persulfate, redox initiators and azo initiators. VAZO-67 is the preferred initiator. The reaction is preferably carried out in the presence of an aromatic solvent such as toluene. Typically, the amount of solvent used is three times the weight of the total amount of monomers. Reaction temperatures are typically from room temperature to 100° C., preferably at about 80° C. Preferably, the reaction is carried out by the continuous and independent addition of the chain transfer agent, monomer, and initiator. For the synthesis of low molecular weight polymers, a large amount of initiator needs to be present in the reactor at the beginning of the reaction.

The weight ratio of acrylic acid to co-monomer may vary over wide ranges, for instance from 2.5 to 10, but is preferably from 5 to 10, most preferably from 8 to 10. The amount of free radical initiator required is typically from 0.5 to 2 weight percent, where the weight percent is based on the total weight of acrylic acid and co-monomer, preferably from 0.5 to 1 weight percent.

Other components may be added to the scale inhibitor composition, such as corrosion inhibitors, surfactants, or agents that inhibit microbiological growth.

The scale inhibitors are used, by adding them to an aqueous system that comes into contact with a metal or another surface prone to scaling, for instance cooling water, boiler water, and reverse osmosis and geothermal/mining water. The scale inhibitors are used in amounts of from 0.1 to 1000 ppm, preferably from 1.0 to 100.0 ppm.

EXAMPLES

The following examples illustrate how to practice the invention. All units are in the metric system and all amounts and percentages are by weight, unless otherwise expressly indicated.

Several copolymers were prepared from acrylic acid and a monomer having hydrophobic properties in the presence of a chain transfer agent and a free radical initiator. The average molecular weight of the copolymers was determined by 13C NMR, and then they were evaluated as scale inhibitors using the so-called "Dynamic Test".

The "Dynamic Test" used, commonly known as tube blocking test, is based on monitoring the increase in pressure resulting from scaling inside a capillary stainless steel tube, as a supersaturated solution is pumped through.

The solution had the following composition: 600 ppm calcium as CaCO3, 300 ppm Mg as $CaCO_3$, 600 ppm alkalinity as $CaCO_3$, 288 ppm sulfate. The pH was 8.6 and the temperature 82° C. The column was 1 m in length and 1 mm internal diameter. The flow rate was 10 mL/min. The test duration was 50 min. The effect of scale control treatments is measured by determining the percent inhibition, defined here as a relative slope pressure/time [(slope untreated−slope test)/slope untreated×100] and the minimum dose required to obtain 100% inhibition (no detectable pressure increase). In addition, the time at which a first departure from the initial pressure occurs ("induction time") is noted. In order to account for small differences in the response of the system at different times, due to slight variations in solution composition or the condition of the scaling surface (column), a reference material was always included in a set of tests. The reference material was hydroxyethylidene diphosphonic acid (HEDP), for which the normal minimum dose was 1.6 ppm. The actual range of the minimum dose for HEDP at different times was 1.1–1.6 ppm. All doses reported have been corrected proportionally to the reference response with respect to the normal value: reported dose=actual dose/HEDP minimum dose×1.6

The copolymers used in the subject process were compared to a representative polyacrylic acid of similar molecular weight (Control) with respect to their effectiveness in inhibiting calcium carbonate scale according to the "Dynamic Test". The test results for the Control (A-E) are set forth in Table I, along with the test results for the copolymers of Examples 1–8. The induction time is the time when a precipitant is first noticed. Generally, the longer the induction time, the more effective the copolymer is at inhibiting scale.

EXAMPLE 1

Copolymer (95/5) of Acrylic Acid and 2-(N-ethyl perfluorooctane-sulfonamide)ethyl acrylate To a 4-neck, 500 mL reactor, equipped with a condenser, mechanical stirrer, thermocouple, 3 addition funnels connected to metering pumps, and a nitrogen inlet and outlet, was added 150 g toluene. The toluene was heated to 80° C. over a period of 15 minutes under constant nitrogen sweep. In the meantime, 0.065 g of VAZO-67 in 10 mL toluene, 5 g of 3-mercaptopropionic acid made up to 10 mL using toluene, and a mixture consisting of 42.75 g of acrylic acid and 2.25 g of 2-(N-ethyl perfluorooctane-sulfonamide)ethyl acrylate were separately added to each of the 3 addition funnels. Then 0.22 g initiator (VAZO-67) dissolved in 4-mL toluene was added to reactor. Thereafter, the three components in the funnels was started and added to the reactor over a period of 2 hours.

After completion of addition, the reaction mixture was stirred for another 2hours at 80° C. Precipitation was observed from the beginning of addition. After the reaction was cooled down to room temperature, an almost gel-like solid product was obtained. This product was removed from the reactor and filtered using a Buchner funnel. The product was dried a vacuum oven overnight at 80° C. Detailed $^{13}C$ and $^{19}F$ NMR confirmed the formation of a random copolymer having acrylic acid groups and hydrophobic groups. GPC analysis showed the average molecular weight of the polymer was about 2000.

The calcium carbonate scale inhibition efficiency of this copolymer is set forth as Examples 1-1 to 1-3 in Table I.

EXAMPLE 2

Copolymer (97.5/2.5) of Acrylic Acid and 2-(N-ethyl perfluorooctane sulfonamide)ethyl acrylate The procedure of Example 1 was followed, except the ratio of acrylic acid to 2-(N-ethyl perfluorooctane-sulfonamide)ethyl acrylate was varied. After drying in the vacuum oven overnight at 80° C., a solid white product obtained. GPC measurements indicated the molecular weight to be around 2000 and NMR studies confirmed the incorporation of 2-(N-ethyl perfluorooctane-sulfonamide) ethyl acrylate hydrophobic groups into the copolymer.

The calcium carbonate scale inhibition efficiency of this copolymer is set forth in Table I as Examples 2-1 to 2-2.

EXAMPLE 3

Copolymer (95/5) of Acrylic Acid and 2-ethyl hexyl acrylate

The procedure described in Example 1was followed, except 2-ethyl hexyl acrylate was used as the source for the hydrophobic groups. After drying in the vacuum oven overnight at 80° C., a solid white product obtained, which was characterized by NMR and GPC. GPC measurements indicated the molecular weight to be around 2000 and NMR studies confirmed the incorporation of n-ethyl acrylate as hydrophobic groups into the copolymer.

The calcium carbonate scale inhibition efficiency of this copolymer is set forth in Table I as Examples 3-1 to 3-4.

EXAMPLE 4

Copolymer (97.5/2.5) of Acrylic Acid and 2-ethyl hexyl acrylate

The procedure of Example 2 was followed, except the ratio of acrylic acid to 2-ethyl hexyl acrylate was varied. After drying in the vacuum oven overnight at 80° C., a solid white product obtained, which was characterized by NMR and GPC. GPC measurements indicated the molecular weight to be around 2000 and NMR studies confirmed the incorporation of n-ethyl acrylate as hydrophobic groups into the copolymer.

The calcium carbonate scale inhibition efficiency of this copolymer is set forth in Table I as Examples 4-1 to 4-3.

EXAMPLE 5

Copolymer (95/5) of Acrylic Acid and n-butyl acrylate

The procedure of Example 1 was followed, except n-butyl acrylate was used as the source for hydrophobic groups. After drying in the vacuum oven overnight at 80° C., a solid white product obtained, which was characterized by NMR and GPC. GPC measurements indicated the molecular weight to be around 2000 and NMR studies confirmed the incorporation of n-butyl acrylate as hydrophobic groups into the copolymer.

The calcium carbonate scale inhibition efficiency of this copolymer is set forth in Table I as Examples 5-1 to 5-2.

EXAMPLE 6

Copolymer (97.5/2.5) of Acrylic Acid and n-butyl acrylate

The procedure of Example 5 was followed, except the ratio of acrylic acid to n-butyl acrylate was varied. On drying in the vacuum oven overnight at 80° C., solid white product obtained, which was characterized by NMR and GPC. GPC measurements indicated the molecular weight to be around 2000.

The calcium carbonate scale inhibition efficiency of this copolymer is set forth in Table I as Examples 6-1 to 6-3.

EXAMPLE 7

Poly(acrylic Acid) with Lauryl End-Groups

In a 4-neck, 500 mL reactor equipped with a condenser, mechanical stirrer, thermocouple, 3 addition funnels connected to metering pumps and nitrogen inlet and outlet, was added 150 g toluene. The toluene was heated to 80° C. over a period of 15 minutes under constant nitrogen sweep. In the meanwhile, the 3 addition funnels were loaded with 0.065 g of VAZO-67 in 10 mL toluene, 2.5 g of lauryl mercaptan made up to 10 mL using toluene and 47.5 g of acrylic acid respectively. Then 0.22 g initiator dissolved in 4-mL toluene was added to reactor. The addition of the three components in the funnels to the reactor was started and continued over a period of 2 hours. After completion of addition, reaction mixture was stirred for another 2 hours at 80° C. and at 90° C. for another hour. Precipitation was observed from the beginning of addition. After the reaction was cooled down to room temperature, a thick white precipitate was obtained.

The product was removed from the reactor and filtered using Buchner funnel. The final polymer was dried in the vacuum oven overnight at 80° C. and characterized by NMR and GPC. GPC analysis showed the polymer molecular weight to be around 7000 and highly polydispersed.

The calcium carbonate scale inhibition efficiency of this copolymer is set forth in Table I as Examples 7-1 to 7-5.

EXAMPLE 8

Copolymer (95/5) of Acrylic Acid and N-hexyl maleamic acid

In a 4-neck, 1 liter reactor equipped with a condenser, mechanical stirrer, thermocouple, nitrogen sparge tube, 2 addition funnels connected to metering pumps and nitrogen inlet &outlet, was added 150 g deionized water. The water was heated to 80° C. with constant nitrogen sparging over 30 minutes. In the meanwhile, 2.25 g of N-Hexyl maleamic acid was pre-dissolved in 42.75 g acrylic acid and loaded in addition funnel. A second and third funnel, were loaded with 0.075 g of ammonium persulfate in 10-mL water and 5 g of 3-mercaptopropeonic acid respectively. At the end of the period, the nitrogen sparge was switched to a nitrogen sweep and 0.25 g-ammonium persulfate dissolved in 2-mL water added to reactor. The three components in the funnels were added to the reaction vessel over a period of 1 hour.

After completion of addition, the reaction mixture was held at 80° C. for 15 minutes and 0.05 g of initiator in 2 mL water added to reactor. The reaction was stirred for 2 hours at 80° C. and 0.1 g sodium bisulfite added to reaction. The reaction was stirred at 80° C. for another hour and then cooled down to 40° C. Sodium hydroxide solution (48 g of a 50% solution) was added slowly, controlling the exotherm with ice-bath. Part of the aqueous solution was poured into acetone to precipitate the solid polymer. Re-precipitation was done to obtain a clean polymer which was dried in the vacuum oven overnight at 80° C. Detailed $^{13}$C NMR confirmed the formation of desired copolymer having an average molecular weight of ~3175.

The calcium carbonate scale inhibition efficiency of this copolymer is set forth in Table I as Examples 8-1 to 8-6.

TABLE I (Effectiveness of copolymers in inhibiting calcium carbonate scale)

| Example | Dose (ppm) | Induction time (min.) | % Inhibition |
|---|---|---|---|
| A | 4.0 | 29 | 96 |
| B | 4.0 | 37 | 98 |
| C | 5.0 | 25 | 99 |
| D | 5.4 | — | 100 |
| E | 6.0 | — | 100 |
| 1-1 | 3.0 | 20 | 97 |
| 1-2 | 4/0 | 44 | 98 |
| 1-3 | 5.0 | — | 100 |
| 2-1 | 3.0 | 24 | 97 |
| 2-2 | 4.0 | — | 100 |
| 3-1 | 3.0 | 22 | 97 |
| 3-2 | 4.0 | 32 | 99 |
| 3-3 | 5.0 | — | 100 |
| 4-1 | 3.0 | 30 | 98 |
| 4-2 | 3.5 | 35 | 99 |
| 4-3 | 3.8 | — | 100 |
| 4-4 | 4.0 | — | 100 |
| 5-1 | 3.7 | 48 | 95 |
| 5-2 | 4.0 | — | 100 |
| 6-1 | 3.0 | 31 | 98 |
| 6-2 | 4.0 | — | 100 |
| 6-3 | 5.0 | — | 100 |
| 7-1 | 4.0 | 27 | 29 |
| 7.2 | 5.0 | 13 | 74 |
| 7-3 | 6.0 | 20 | 88 |
| 7-4 | 8.0 | 19 | 92 |
| 7-5 | 8.5 | 19 | 92 |
| 8-1 | 3.0 | 22 | 95 |
| 8-2 | 4.0 | 20 | 98 |
| 8-3 | 5.0 | 40 | 99 |
| 8-4 | 5.5 | 41 | 99 |
| 8-5 | 6.0 | 26 | 99 |
| 8-6 | 6.4 | — | 100 |

The data in Table I indicate that the copolymers of the subject invention are in most cases better scale inhibitors than polyacrylic acid.

While the invention is described in various embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, or the best mode contemplated for carrying out this invention, but that the invention will include all embodiments falling within the scope of the appended claims.

We claim:

1. A process for inhibiting the formation of calcium scale on a metal surface exposed to an aqueous system comprising:
   adding from 0.1 to 1000 ppm of a random copolymer of acrylic acid and a co-monomer that has hydrophobic properties, whereby said random copolymer is synthesized in the presence of a mercapto chain transfer agent having a hydrophobic group, a solvent, and a free radical initiator, to said aqueous system containing calcium ions to which said metal surface is exposed, where the weight ratio of acrylic acid to co-monomer having hydrophobic properties, used to prepare said random copolymer, is from 2.5:1 to 10:1, and the average molecular weight of said random copolymer is from 500 to 5,000.

2. The process of claim 1 wherein the co-monomer is selected from the group consisting of 2-ethylhexyl acrylate, n-butyl acrylate, and mixtures thereof, and the mercapto chain transfer agent having a hydrophobic group is selected from the group consisting of hexyl mercaptan, lauryl mercaptan, butyl mercaptan, and mixtures thereof.

3. The process of claim 1 wherein the co-monomer is a linear mercapto compound selected from the group consisting of hexyl mercaptan, lauryl mercaptan, butyl mercaptan, and mixtures thereof.

4. The process of claim 1 wherein the co-monomer is 2-(N-ethyl perfluoro octane sulfonamide) ethyl acrylate.

5. The process of claim 1 wherein the co-monomer is a fatty acid modified maleamic acid.

6. The process of claim 1 wherein a corrosion inhibitor is used in the process.

7. The process of claim 1 wherein a surfactant is used in the process.

8. The process of claim 1 wherein an agent that inhibits microbiological growth is used in the process.

9. The process of claim 1 wherein a corrosion inhibitor, surfactant, and an agent that inhibits microbiological growth is used in the process.

10. The process of claim 1 wherein the solvent used to synthesize the random copolymer is toluene.

* * * * *